(No Model.)

J. L. ARNOLD & G. W. GOLDINGER.
NUT LOCK.

No. 409,766. Patented Aug. 27, 1889.

Witnesses.
A. Ruppert,
H. A. Daniels

Inventors.
John L. Arnold,
George W. Goldinger
Per
Thomas K. Simpson, Atty

UNITED STATES PATENT OFFICE.

JOHN L. ARNOLD AND GEORGE W. GOLDINGER, OF AVENUE, PENNSYLVANIA.

NUT-LOCK.

SPECIFICATION forming part of Letters Patent No. 409,766, dated August 27, 1889.

Application filed September 20, 1888. Serial No. 285,844. (No model.)

*To all whom it may concern:*

Be it known that we, JOHN L. ARNOLD and GEORGE W. GOLDINGER, citizens of Harrison township, residing at Avenue, in the county of Allegheny and State of Pennsylvania, have invented certain new and useful Improvements in Nut-Locks; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to improve that class of nut-locks in which a subjacent washer is turned up against one or more sides of the nut.

Figure 1:
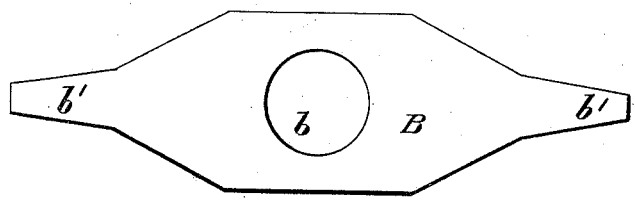
Figure 1A:
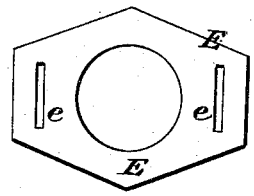
Figure 2:
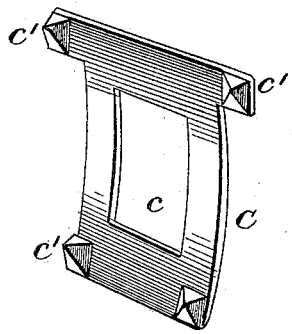
Figure 3:
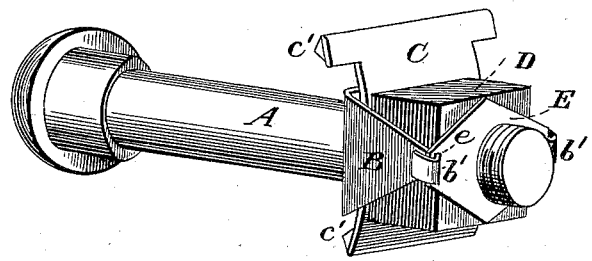

Figures 1 and 1$^a$ of the drawings are detail plan views of the washer and top plate, showing their construction; Fig. 2, a detail perspective view of the plate-spring which prevents the washer from turning; and Fig. 3, a perspective view showing my invention applied.

In the drawings, A represents the bolt headed at one end, threaded at the other, and provided with a neck of irregular shape, so that the bolt cannot turn.

B is the flexible sheet-metal washer with the hole $b$, through which the bolt passes, and preferably tapered ends $b'$ $b'$, said washer being first placed over the bolt and made to rest against the fish-plate.

C is a curved spring-plate, through whose hole $c$ passes the bolt, and which is end-studded on the under side at $c'$. The nut D is then screwed "home" on the bolt, so as to compress the upwardly-convex side of the spring and flatten out the latter on the washer B, as well as cause the studs $c'$ to bite upon the fish-plate. Thus the spring and washer cannot move until the nut has been unscrewed, while the nut itself is upwardly pressed against the threads of the bolt and made less liable to turn. The ends $b\,b$ of the washer are now turned up against the opposite sides of the nut and passed through the opposite slots $e\,c$ of the middle-apertured top plate E, which has been placed over the bolt. The ends $b'$ $b'$ are then bent outwardly over the ends of the plate E, so as to lock the two plates B E tightly together. By this means the nut is effectually locked to the bolt, but may be unlocked by simply unbending the ends $b'$ $b'$, taking off the plate E, and straightening the washer-plate B.

Having thus described all that is necessary to a full understanding of our invention, what we claim as new, and desire to protect by Letters Patent, is—

The combination, with a bolt and nut, of a top plate E, the curved spring bottom plate C, adapted to bite on a fish-plate, and a locking-plate B, the latter passing under plate C, up on opposite sides of the nut, and catching by hooks $b'$ $b'$ in holes $e\,c$ of the top plate, as shown and described.

In testimony whereof we affix our signatures in presence of two witnesses.

JOHN L. ARNOLD.
GEORGE W. GOLDINGER.

Witnesses:
FRANK A. HATHAWAY,
JOSEPH M. HATHAWAY.